Patented May 23, 1950

2,508,876

UNITED STATES PATENT OFFICE 2,508,876

ALKYD-MELAMINE RESIN COATING COMPOSITIONS

Milton J. Scott and Frank J. Hahn, Springfield, Mass., assignors to Monsanto Chemical Company, St. Louis, Mo., a corporation of Delaware No Drawing. Application December 24, 1946, Serial No. 718,270

4 Claims. (Cl. 260—21)

1

This invention relates to surface coating compositions. More particularly, the invention relates to coating compositions comprising alkyd resins modified with the condensation product of melamine, an aryl sulfonamide, an aldehyde and an alcohol.

The modification of alkyd resins with melamine resins to improve the properties of the alkyd resins has been only partially successful since the melamine resins have only a limited compatability with alkyd resins, decrease the gloss of the alkyds with which they are compatible, decrease the stability of high acid number alkyds and cause a tendency towards brittleness of the modified films.

An object of this invention is to provide a modified alkyd resin coating composition.

A further object is to modify alkyd resins with melamine resins.

Another object is to modify alkyd resins with aryl sulfonamide modified melamine resins.

These and other objects are attained by incorporating melamine resins which have been modified by reaction with an aryl sulfonamide into alkyd resin coating compositions.

The following examples are given in illustration and are not intended as limitations on the scope of this invention. Where parts are mentioned, they are parts by weight.

Example I

A gray enamel having the following formulation was prepared:

| | Parts |
|---|---|
| Alkyd resin | 100 |
| Sulfonamide modified melamine resin | 20 |
| Pigment | 30 |
| Solvent | 55 |

The alkyd resin was a dehydrated castor oil modified glyceryl phthalate resin containing about 40% fatty acids and having an acid number of from 6–10. The enamel was brushed onto a steel panel and baked for about 1 hour at about 250° F. The film thus produced was compared with a similar film made from the same formu-

2 lation except that no melamine resin was used. The melamine modified alkyd resin had a Sward hardness of 30 and was unaffected by 4 hours' immersion in an alkaline medium. The film containing none of the sulfonamide modified melamine resin had a Sward hardness of 18 and was cracked and peeled after 4 hours' immersion in the same alkaline solution.

The sulfonamide modified melamine resin was made by reacting together melamine, formaldehyde, and a mixture of ortho and para toluene sulfonamides under alkaline conditions, acidifying the product and reacting it with butanol under acid conditions.

The modification of alkyd resins with the sulfonamide-melamine resins yields a product vastly superior to alkyd resins modified with urea resins.

Example II

Two white baking enamels were prepared according to the following formulae:

| | Parts | Parts |
|---|---|---|
| Alkyd resin | 22 | 22 |
| Sulfonamide modified melamine resin | | 11 |
| Urea resin | 11 | |
| Pigment | 26 | 26 |
| Solvent | 41 | 41 |

The alkyd resin was a castor oil modified glyceryl phthalate resin containing about 45% oil and having an acid number of 4.5 to 6.5. The urea resin was a butylated urea-formaldehyde resin and the melamine resin was the same as the one shown in Example I.

The enamels were reduced to spraying consistency with xylol, sprayed on steel panels and the coating thus produced was baked at 300° F. for about 20 minutes. The following properties of the two enamels were evaluated:

| | Urea Enamel | Sulfonamide-Melamine Enamel |
|---|---|---|
| Gloss (Gardner 60° meter) | 72 | 82. |
| Sward Hardness | 12 | 20. |
| Immersion in xylol (16 hrs.) | slight softening | very slight softening. |
| Immersion in alkali | film disrupted | film intact. |
| Gloss retention } 200 hours in weatherometer | complete loss | slight loss. |
| Chalk resistance | severe chalking | no chalking. |
| Color retention—16 hrs. at 300° F | yellow to red | slightly yellow. |

Alkyd resins modified with sulfonamide-melamine resins are superior to alkyd resins modified with melamine ether resins as shown in the following example:

Example III

A white enamel based on the formula of Example II was prepared substituting a butylated melamine-formaldehyde resin for the urea resin. The properties of the baked enamel were found to be Gloss, 57
Immersion in xylol (16 hrs.), slight embrittlement on recovery
Immersion in alkali, badly blistered
Chalk resistance, severe chalking If these results are compared with those shown in Example II, the marked superiority of the sulfonamide melamine resins as modifiers for alkyd resins is clearly evident.

The sulfonamide-melamine resins to be used as modifiers for alkyd resins are made by reacting melamine with an aldehyde, an alcohol, and an aryl sulfonamide. Methods for carrying out the reaction and for obtaining resins having the desired properties are set forth and claimed in the copending U. S. application S. N. 718,269. In general, the melamine, aldehyde, and sulfonamide are reacted together under alkaline conditions and then further reacted with an alcohol or mixture of alcohols under acid conditions.

The aryl sulfonamides shown in the examples may be replaced in whole or in part by other aryl sulfonamides such as benzene sulfonamide and ring-substituted benzene sulfonamides in which the substituent is an alkyl group. The amount of aryl sulfonamide used may be varied over a wide range. As little as 0.1 mol per mol of melamine may be used and the amount of aryl sulfonamide may be increased to more than 1 mol per mol of melamine. A preferred range to obtain advantageous surface coating resins is from about 0.2 to about 0.4 mol of aryl sulfonamide per mol of melamine.

Example IV

| | Parts |
|---|---|
| Melamine | 100 |
| Santicizer 9 [1] | 43 |
| Formalin (37% formaldehyde) | 463 |
| 92% butanol | 505 |

[1] Santicizer 9 is a trade name for a mixture of ortho and para toluene sulfonamides.

The melamine, Santicizer 9 and Formalin were placed in a reaction vessel and the pH of the mixture adjusted to about 8–9 with 5% aqueous sodium hydroxide. The mixture was refluxed at atmospheric pressure until the solution formed began to show slight cloudiness (about 1 hour after the start of refluxing). At this point all of the butanol and sufficient 0.5 N formic acid to render the solution acid were added to the reaction mixture and refluxing at atmospheric pressure was continued for about 2 hours. The excess butanol and water were then removed by azeotropic distillation, dry butanol being added during the distillation, until the distillate contained but a single phase. The resulting solution was then concentrated under approximately 23 inches of mercury vacuum until the temperature of the solution reached about 98° C. Then xylol was added to obtain a solution containing 60% solids in a solvent comprising a 50–50 mixture of xylol and butanol. The resulting solution was clear and colorless and could be coated on various surfaces to produce a clear, colorless film. The resulting coating was extremely hard, had a very high gloss and was quite brittle.

Example V

Example IV was repeated except that the Santicizer 9 was not added until after the reaction between melamine and the Formalin to make methylol melamine was completed. The resultant resin appeared to be slightly softer than that made by Example IV, but otherwise was identical with it.

Example VI 50 parts of benzene sulfonamide were substituted for the Santicizer 9 shown in Example IV. The reaction proceeded as described in Example IV and a clear, colorless resin solution was obtained from which a clear, colorless film was cast to provide a hard, brittle film having a high gloss.

Example VII

| | Parts |
|---|---|
| Melamine | 100 |
| Para toluene sulfonamide | 43 |
| Formalin | 463 |
| Methanol | 505 |

The melamine, para toluene sulfonamide and Formalin were refluxed at atmospheric pressure at a pH of approximately 8–9 obtained with 5% aqueous sodium hydroxide, until the reaction medium began to be cloudy. At this point, the methanol was added and the solution was made slightly acid by the addition of formic acid. The resultant mixture was refluxed at atmospheric pressure for about 2 hours and then water and methanol were removed and separated by fractional distillation, the dry methanol being returned to the reaction vessel. In this example, it is not necessary to resort to azeotropic distillation. The product was a methanol solution of methylol melamine modified by para toluene sulfonamide and methanol.

The amount of formaldehyde used may vary from 1 mol per mol of melamine to 6 or more mols per mol of melamine.

Butanol and methanol are disclosed in the examples as alcohols to be reacted with the methylol melamine. They may be substituted in whole or in part by other alcohols and substituted alcohols including aliphatic, cycloaliphatic, aromatic, nitro and amino alcohols, such as ethanol, propanol, isopropanol, pentanols, octanols, lauryl alcohol, cetyl alcohol, stearyl alcohol, cyclohexanol, benzyl alcohol, cinnamyl alcohol, allyl alcohol, 2-nitro-1-butanol, 2-nitro-2-methyl-1-propanol, 2-nitro-2-methyl-1,3-propane diol, 2-nitro-2-ethyl-1,3-propane diol, tris (hydroxy methyl) nitro methane, 2-amino-1-butanol, 2-amino-2-methyl-1-propanol, 2-amino-2-methyl-1,3-propane diol, 2-amino-2-ethyl-1,3-propane diol, tris (hydroxy methyl) amino methane, etc. Mixtures of two or more alcohols may be used if desired.

The pH of the reaction mixture should be kept on the alkaline side, about 8–9, until the reaction between melamine and formaldehyde to form methylol melamines is substantially completed. At this point the pH should be adjusted to the acid side. Various acids such as formic acid, acetic acid, hydrochloric acid, phosphoric acid, etc. may be used to create the acid pH. The reaction may also be carried out at temperatures lower than the reflux temperature, for example, 25 to 40° C. to obtain essentially monomeric low molecular weight resins, if desired.

The sulfonamide modified melamine resins are compatible with alkyd resins in general i. e., polyester resins made by reacting polyhydric alcohols such as glycols, glycerol, sorbitol, pentaerythritol, etc. with polybasic acids such as phthalic acid, maleic acid, adipic acid, etc. which resins may be modified with saturated and unsaturated monobasic acids, saturated and unsaturated monohydric alcohols and drying or nondrying oils such as castor oil, linseed oil, tung oil, perilla oil, oiticica oil, and the acids or glycerides derived therefrom.

The sulfonamide modified melamine resins increase the hardness, alkali resistance, solvent resistance, gloss retention, chalk resistance, and color retention of the alkyd resins. They do not impair and often they increase the original gloss of the alkyd resins. In general, from 10 to 40% of sulfonamide modified melamine resin is used with 90 to 60% of alkyd resin but the excellent compatibility of the two resins makes it possible to use combinations outside of this range to achieve desired results. In addition, driers such as manganese, lead, and cobalt driers may be used if desired.

The coatings obtained by the use of sulfonamide modified melamine resins are superior in many properties to coatings obtained using alkyd resins alone or alkyd resins modified with urea resins, urea ether resins, melamine-aldehyde resins, melamine-aldehyde-alcohol resins, etc. The coatings are so tough after baking that they may be formed and drawn. For example, a steel plate coated with the enamels of this invention may be subjected to deep drawing operations without destroying the coating or altering its properties.

It is obvious that many variations may be made in the processes and products of this invention without departing from the spirit and scope thereof as defined in the appended claims.

What is claimed is:

1. A coating composition comprising an organic solvent soluble mixture of from 90 to 60% of an alkyd resin with from 10 to 40% of a melamine-formaldehyde - alcohol-aryl sulfonamide reaction product in which the aryl sulfonamide is taken from the group consisting of benzene sulfonamide and toluene sulfonamides, the ratio of the aryl sulfonamide to melamine varying from 0.2:1 to 0.4:1 on a molar basis, said reaction product having been prepared by reacting melamine and the aryl sulfonamide with formaldehyde at a pH of 8 to 9 and then reacting the products with the alcohol under acid conditions, said process being carried out at temperatures from 25° C. to reflux temperature.

2. A coating composition as in claim 1 wherein the alkyd resin is an oil modified alkyd resin.

3. A coating composition as in claim 1 wherein the aryl sulfonamide is a toluene sulfonamide.

4. A coating composition as in claim 3 wherein the alcohol is butanol.

MILTON J. SCOTT.
FRANK J. HAHN.

REFERENCES CITED

The following references are of record in the file of this patent:

UNITED STATES PATENTS

| Number | Name | Date |
| --- | --- | --- |
| 2,197,357 | Widmer | Apr. 16, 1940 |
| 2,218,474 | Moore | Oct. 15, 1940 |
| 2,368,451 | D'Alelio | Jan. 30, 1945 |